3,657,396
POLYVINYLMETHYL ETHER ACRYLIC POLYMER CONTAINING PRESSURE-SENSITIVE ADHESIVE COMPOSITIONS
Kaoru Kuramoto and Nobuo Maejima, Tokyo, Kiichiro Miyakubo, Kawagoe-shi, and Isao Uzuki, Sayama-shi, Japan, assignors to Kuramoto Sangyo Co., Tokyo, Japan
No Drawing. Filed Aug. 28, 1968, Ser. No. 755,827
Claims priority, application Japan, Feb. 7, 1968, 43/7,197
Int. Cl. C09j 3/14
U.S. Cl. 260—901    3 Claims

ABSTRACT OF THE DISCLOSURE

An adhesive composition containing a polyvinylmethyl ether as the principal component and also containing an additive consisting of a water-soluble polymer having compatibility relative to said first mentioned polymer. The composition is not inferior in adhesion, cohesion and tackiness to the conventional pressure-sensitive adhesive composites, and it has the excellent feature that it can be obtained as a transparent, water-soluble product.

BACKGROUND OF THE INVENTION (a) Field of the invention

The present invention is concerned with a pressure sensitive adhesive composition which contains a polyvinylmethyl ether as the principal component and also contains an additive consisting of a water-soluble polymer having compatibility to said first named polymer, and which is superior in such properties as adhesion and cohesion and which is transparent and soluble in water. The fact that the pressure-sensitive adhesive composition of the present invention possesses the aforesaid superior properties permits this composition to be used in adhesive tapes, adhesive labels and for many other purposes.

(b) Description of the prior art

With the recent rapid development in adhesive tapes and adhesive labels, there have been introduced various types of pressure-sensitive adhesive compositions. Most of these pressure-sensitive adhesive compositions of the prior art have been manufactured by mixing, in the form of a solution, an elastomer such as natural rubber or synthetic rubber with an appropriate amount of a tackifier such as rosin, hydrocarbon resins or softening agents. These pressure-sensitive adhesive compositions of the prior art had drawbacks such as that they were of poor resistance to weathering and ageing due to passage of time; that they became easily hardened or softened due to changes in the ambient temperature in summer time and winter time; that when the adhesive composites were subjected to ageing or allowed to stand in the state of being stuck to the faces of the objects to which they were applied, the adhesive composites stubbornly stuck on the faces of the objects when it was intended to peel the adhesive tapes or labels off therefrom and, thus, it was utterly impossible to remove the adhesive compositions completely off the faces of the objects, unless some sort of organic solvent was used to wipe the composition off the faces of the objects; and further that, when drops of water or moisture were present on the faces of the objects onto which the adhesive compositions were to be applied, it was difficult to obtain a satisfactory adhesion of the adhesive compositions to the faces of such objects. In order to overcome the aforesaid various drawbacks of the pressure-sensitive adhesive compositions of the prior art, it was considered appropriate to use water-soluble pressure-sensitive adhesive compositions. If the pressure-sensitive adhesive composition is soluble in water, there will be the following advantages such that the retention of the pressure-sensitive adhesive composition on the face of the object to which the adhesive composition has been applied—which constitutes a problem in case it is intended to remove the adhesive composition off the face of the object—will be solved easily by merely washing the adhesive-coated face of the object or by wiping the adhesive composition off the face of the object with a wet cloth or like wet material, and that, even when the surface of the object to which the adhesive composition is to be applied is slightly wet with water, the pressure-sensitive adhesive composite still will have an adhering ability, and accordingly, it can be applied to the wet face of an object without any difficulty. In order to solve some of the foregoing drawbacks of the adhesive compositions of the prior art, there have been introduced certain types of water-soluble pressure-sensitive adhesive composites as disclosed in U.S. Pat. No. 2,985,605 and U.S. Pat. No. 3,249,572. The water-soluble pressure-sensitive adhesive compositions proposed by the aforesaid patents are compositions consisting of a polyvinyl alcohol and a polyethyleneamine or a polyethyleneimine. However, these adhesive composites of the prior art had the drawbacks such that they lacked cohesion which is an important property required of adhesive compositions of this type and that they depended a great deal upon the ambient temperature.

We concentrated our attention on the fact that vinylmethyl ether polymer are soluble in water and that they possess adhesive property; and based on this fact we conducted an experiment for the purpose of obtaining pressure-sensitive adhesive compositions by the use of these polymers. It was found as a result of this experiment, however, that in case vinylmethyl ether polymers were used independently, they exhibited an adhesive property but they failed to exhibit cohesive property and that, accordingly, they exhibited a highly increased fluidity. As a result, we reached the conclusion that the independent use of these vinylmethyl ether polymers as the only component of the pressure-sensitive adhesive composites was not suitable. It is a well-known art to use an elastomer having a highly increased cohesion in order to improve the cohesive ability of pressure-sensitive adhesive compositions in general. In those pressure-sensitive composites where the use of elastomers is not possible, it has been the practice to obtain cross linking of molecules by the introduction into the adhesive compositions of an isocyannate so that part of the pressure-sensitive adhesive compositions will form a three dimensional chemical structure as is taught by Japanese patent publication No. 1,471/1962, or to produce an associated structure with the elastomer by the inclusion therein of such substances as an alkylphenolic resin in a well known manner. When no transparency in the pressure-sensitive adhesive composition is required there has been employed a procedure of increasing the cohesion by the inclusion of a filler consisting of fine particles of substances such as titanium oxides, calcium carbonates or zinc oxides.

SUMMARY OF THE INVENTION

It is, therefore, the object of the present invention to provide a transparent and water-soluble pressure-sensitive adhesive composition which is not inferior in such properties as adhesion, cohesion and tackiness to the conventional pressure-sensitive adhesive composites of this type and which can be used in adhesive tapes, adhesive labels and for many other purposes.

The presure-sensitive adhesive composite according to the present invention is composed of a polyvinylmethyl ether as its principal component, and the most important aspect of said composition lies in its transparency and solubility in water. Accordingly, for the purpose of enhancing the cohesion of such a composite, it is not appropriate to rely on the aforesaid known art of introducing cross-linking between the molecules of the composition or of introducing a filler in the composition. After an extensive research conducted by us for the purpose of avoiding the inclusion of the step of producing said cross linking of molecules and of avoiding the use of said filler, we have made the present invention. It was considered by us that the most appropriate method for realizing these purposes would be to improve the cohesion of the adhesive composition by the inclusion, in a polyvinylmethyl of, a water-soluble polymer which is of a satisfactory compatibility to said polyvinylmethyl ether. Based on this concept, we conducted a thorough investigation on the type and the amount of the polymer to be added to the polyvinylmethyl ether, and as a result, it was found that the composition which will be described later in detail would bring forth an extremely satisfactory result.

The polymers which can be employed as a cohesion-enhancing component of the pressure-sensitive adhesive composition of the present invention include the following polymers. Specifically, cellulosic polymers such as carboxymethyl cellulose and hydroxyethyl cellulose; water-soluble polyviny compounds such as polyvinyl alcohol (those having a polymerization degree of 500 to 2000, a saponification of 70 to 99% equivalent) and polyvinyl-pyrrolidone; water-soluble phenolic resins; water-soluble acrylic homopolymers such as polyacrylamides, N-methylolpolyacrylamides and polyacrylic acids; acrylic copolymers such as those consisting of monomers such as acrylic acid, acrylamides and N-methylolacrylamides and various kinds of acrylates and methacrylates, meaning lower alkyl esters such as methyl esters, ethyl esters and n-butyl esters; copolymers of vinylmethyl ether and maleic anhydride (PVM–MA) and carboxylic-modified polyvinyl acetate, were found to be effective for the purpose of the present invention. The aforesaid acrylic homopolymers and copolymers are obtained by subjecting the aforesaid monomers to polymerization in a solvent such as toluol, xylene and ethyl acetate under the polymerizing conditions which are represented by a monomer concentration of 25–50% by weight, the use of benzoyl peroxide as the catalyst in an amount of 0.1–0.5% by weight relative to the monomer, a polymerizing temperature of 60–80° C., an atmosphere consisting of a nitrogen gas current, and a polymerizing time of 5–8 hours. The acrylic polymers thus obtained have a viscosity of 8000 to 12,000 cps. at 30° C. when measured by the Brookfield viscosimeter, provided that each of these polymers contains 25% by weight of solids. These polymers are easily dissolved in water. The acrylic copolymers which can be applied to the pressure-sensitive adhesive composition of the present invention are of a composition which contains a water-soluble component, that is to say, such substances as acrylic acid, acrylamides and N-methylolacrylamides, in an amount at least 60% equivalent. In general, it is desirable that the amount of such a substance contained is in the range of from 70 to 95% equivalent. An amount of 60% equivalent or smaller will cause the inconvenience that because of difficulty of being dissolved in water, the resulting adhesive composite will become unsuited when used for practical purposes.

These additive polymers are included in the pressure-sensitive adhesive compositions in an amount such that they will not hinder the adhesive property of said compositions and said amount can vary depending upon the type of the additive polymers. More specifically, the cellulosic polymers are added in amount usually 1.0–20.0 parts by weight relative to 100.0 parts by weight of the polyvinylmethyl ether which constitutes the principal component of the composite. Polyvinyl compounds also are added in exactly the same amount as with the aforesaid polymers, namely, 1.0–20.0 parts by weight usually. The amount of water-soluble phenolic resins added is usually in the range of 5.0–80.0 parts by weight.

Acrylic polymers are added usually in an amount of 0.5–30.0 parts by weight. Polymers of vinylmethyl ether and maleic anhydride are added in an amount which is usually 1.0–20.0 parts by weight. Carboxylic-modified polyvinyl acetate is added usually in an amount of 0.5–10.0 parts by weight.

The principal component of the composition of the present invention consists, as described earlier in this specification, of a polyvinylmethyl ether which, by itself alone, has an adhesive property. Accordingly, polyvinylmethyl ether can be used singly, but it also can be used in combination with polyvinylethyl ether. By the admixture of polyvinylethyl ether, there is obtained a composition which is comparable to ordinary pressure-sensitive adhesive compositions, said composition being such that it has substantially the same adhesiveness and an enhanced cohesion. However, in view of the occurrence of changes, such as softening, in the composition due to reasons such as changes in temperature, there is included a water-soluble polymer such as the one which is used in the present invention. The permissible amount of said polyvinylethyl ether to be included can vary depending on the type of the ether that is employed. For example, the polyvinylethyl ether which is manufactured and sold by Union Carbide Corporation of U.S.A. consists of three kinds of products having three different degrees of polymerization. They are sold under the tradenames of EDBC, EHBM and EHBN having a greater degree of polymerization in that order. However, there is a limit in the amount of polyvinylethyl ether to be compounded, and this amount decreases in the foregoing order. Specifically, in case of EDBC, it is added in an amount of about 50.0 parts by weight relative to 100.0 parts by weight of polyvinylmethyl ether. In case of EHBM, it is about 10.0 parts by weight, and in case of EHBN, it is about 5.0 parts by weight. These three kinds of ethers can be used in combination of two or three kinds. The limit of the total amount of such a combination is usually about 50.0 parts by weight. In these instances, the amount of the water-soluble polymer to be admixed therewith is identical to the amount added where the composition contains polyvinylmethyl ether, by itself. Polyvinylmethyl ethers are dissolved in the solvent in the preparation of the solutions of adhesive. It is, however, necessary to select the type of the solvent depending on the type of the water-soluble polymer that is added. Usually, such a solvent consists of methanol and toluol which are employed independently and also consists of a mixed solvent consisting of methanol as a base and water, toluene or the like. Their mixing ratio is determined by taking into account the coatability and the compatibility, but usually, water, toluol and other solvents are mixed in amount of about 30.0–50.0% by weight relative to methanol. Polyvinylethyl ether is added in the present invention in such a way that, in case it consists of EDBC, the latter which is a solid substance is dissolved in a solution of polyvinylmethyl ether, whereas EHBM and EHBN which are obtained as a 25% hexane solution are first evaporated and the resulting solid substances are dissolved in a solution of polyvinylmethyl ether when used. Therefore, the term "part by weight" of these EHBM and EHBN means the part by weight of these substances in solid form.

We conducted a cohesion test of the pressure-sensitive adhesive composition in a manner as described in detail below. First pressure-sensitive adhesive compositions were prepared by blending 0.5–40 parts by weight of the aforesaid additives or polymers with 100 parts by weight of a commercially available Lutonar M (which is a trademark of a product of Badische Aniline und Soda Fabrik of Germany) which was a vinylmethyl ether polymer. These adhesive compositions were applied onto the already anchor-coated faces of the backings of polyester film each having one side provided with an anchor-coating and the other side provided with a release-coating in a known manner, to a thickness of 0.025 mm., and the resulting films were dried and thereafter they were wound in the form of roll and were cut into desired widths. In this way, adhesive tapes were manufactured. By controlling amounts of the additive polymers, it was possible to obtain adhesive tapes which had balanced adhesion, cohesion and tackiness. In order to make a comparative evaluation of the result of the improved cohesion of these adhesive tapes, individual samples each having the size of 15 x 25 mm. were applied respectively onto the face of a Bakelite panel (a panel made of phenolic resin) of 5 x 15 cm. in size, and thereafter they were given double two way runs of pressure roller which weighed 5 kg. over the non-adhesive surfaces of the samples. Thereafter, they were loaded with a vertical weight of 500 gr. and were left in this state at 20° C. and a relative humidity of 65% for 1 hour. At the end of this 1 hour, the amount of displacement occurring in the adhesive tapes from their initial position in which the tapes were first attached on the Bakelite panel was measured. The result was that the adhesive tape carrying the adhesive agent which consisted of only a vinylmethyl ether polymer, spontaneously detached off the Bakelite panel at the end of 8 minutes counting from the end of the aforesaid 1 hour. In contrast to this, the sample whose adhesive composition contained 1 part by weight of polyvinyl alcohol (having a polymerization degree of 500 and a saponification of 80% equivalent) as the additive showed a displacement of 2 mm., and the sample which contained 5 parts by weight of the same additive showed a displacement of 0.5 mm. Thus, the inclusion of an additive polymer in a greater amount resulted in a markedly reduced fluidity of the adhesive composition. Aside from this cohesion test, there was also conducted a test of physical properties such as adhesion, tackiness and solubility in water, in order to obtain the water-soluble pressure-sensitive adhesive composition as is aimed at by the present invention. The result of this test was that the inclusion of the aforesaid polymers was found to be extremely effective as will be described in detail later. The adhesion test was conducted in the following manner. Each sample tape was applied onto the surface of a stainless steel panel. Thereafter, the tape was given double two way runs of a pressure roller which weighed 5 kg. over the face which contained no adhesive composite. Then, one end portion of each sample tape was turned up, and, starting at this curled end portion, the tape was peeled gradually off the stainless plate at the speed of 30 cm. per minute. The value of the resistance exerted by the tape during this peeling operation was expressed in terms of gram. The tackiness test was conducted in the following manner. A tape carrying an adhesive agent on both sides was applied first onto the surface of a testing panel held at an angle of 30 degrees relative to the horizontal plane of the floor. The non-adhesive reverse side of each sample tape measuring 25 mm. x 10 cm. in size was secured onto the adhesive surface of the aforesaid first tape which was then already stuck firmly onto the face of the testing panel. Balls which were made of stainless steel were allowed to roll downwardly along the face of this testing panel, starting at the distance of 10 cm.— serving as the auxiliary running area—located up-stream from the upper edge of the sample tape on the face of the testing panel. The size of the ball which was retained on the adhesive face of each sample tape was used to express the tackiness of the adhesive composite. For example, in case the ball which was retained on the adhesive face of a sample tape had a diameter of $5/32$ of an inch, the tackiness of this adhesive composite of the sample tape was expressed as No. 5. The water-solubility test was conducted in the following manner. First, test samples were prepared by applying each pressure-sensitive adhesive composition solution onto the face of each glass panel measuring 10 x 10 cm. in size to a thickness of 0.025 mm., and then drying the coated panel. These sample plates were immersed in an isothermal water tank containing water which was held at a temperature of 20±1° C. and which was being stirred evenly. The time which was required by the applied pressure-sensitive adhesive composition to dissolve completely in the water was measured in terms of second.

DESCRIPTION OF THE PREFERRED EMBODIMENTS

The present invention will be hereunder described in further detail by referring to the preferred embodiments of the invention.

EXAMPLE 1

An acrylic copolymer consisting of 90% equivalent of acrylic acid and 10% equivalent of n-butyl acrylate, together with an anti-oxidant consisting of 2,6-di-tert.-butyl-4-methylphenol, was dissolved in a solvent consisting of toluol. Into the resulting solution was uniformly dissolved a polyvinyl methylether and thus, a solution of a pressure-sensitive adhesive composition having the following composition:

| | Parts by wt. |
|---|---|
| Polyvinyl methylether | 100 |
| Copolymer of 90% equivalent of acrylic acid and 10% equivalent of n-butyl acrylate | 0.5 |
| 2,6-di-tert.-butyl-4-methylphenol | 1 |
| Toluol | 150 | was prepared.

The solution thus obtained was then applied onto the already anchor-coated face of the aforesaid polyester film and said coated film was dried. Thereafter, the resulting film was wound around a core. Thus the roll of film was cut into desired widths, and as a result, adhesive tapes were obtained. These adhesive tapes which were obtained in this example showed a displacement of 0.4 mm., an adhesion of 800 gr. for the width of 25 mm. An increase in the amount of the acrylic copolymer which was contained in the aforesaid pressure-sensitive adhesive composition, resulted in a straight line reduction in the amount of the displacement which reached zero when the amount of the additive was 30 parts by weight. However, the tackiness showed a gradual decrease as the amount of the additive increased. The adhesive composition which contained 40 parts or more by weight of the additive showed a tackiness which was almost zero and therefore was found to be unusable as a pressure-sensitive adhesive. The use of other acrylic polymers also showed similar effects. As stated above, in case acrylic polymers were used as the additive, the desirable amount of these polymers added was in the range of from 0.5 to 30 parts by weight.

EXAMPLE 2

Pressure-sensitive adhesive compositions were manufactured in the same manner as that described in Example 1, except for the use, in various different blend ratios, of polyacrylic acids and copolymers of acrylic acid and n-butyl acrylate having a different copolymerization ratio, in lieu of the copolymer of acrylic acid which was used in Example 1. These adhesive compositions were used to produce adhesive tapes. The adhesion, cohesion and tackiness of the resulting adhesive tapes were measured and observed. The result is shown in the following table.

| Adhesive tape No. | Copolymer composition (percent equivalent) | | Amount added (part by weight) | Adhesion (gr./25 mm.) | Cohesion (displacement, mm.) | Tackiness (No.) | Solubility in water (sec.) |
|---|---|---|---|---|---|---|---|
| | Acrylic acid | n-Butyl acrylate | | | | | |
| 2 | 100 | | 0 | (1) | (2) | 12 | 40 |
| 3 | 100 | | 10 | 850 | 14 | 8 | 40 |
| 4 | 100 | | 20 | 710 | 0.6 | 6 | 55 |
| 5 | 100 | | 30 | 540 | 0.2 | 4 | 70 |
| 6 | 95 | 5 | 10 | 780 | 0.4 | 8 | 65 |
| 7 | 95 | 5 | 20 | 620 | 0.3 | 7 | 80 |
| 8 | 95 | 5 | 30 | 390 | 0.1 | 5 | 100 |
| 9 | 95 | 5 | 40 | 240 | 0 | 5 | 120 |
| 10 | 80 | 20 | 10 | 700 | 0.4 | 9 | 80 |
| 11 | 80 | 20 | 20 | 440 | 0.3 | 7 | 85 |
| 12 | 80 | 20 | 30 | 380 | 0.1 | 5 | 130 |
| 13 | 80 | 20 | 40 | 150 | 0.1 | 4 | 130 |
| 14 | 70 | 30 | 10 | 650 | 0.5 | 8 | 90 |
| 15 | 70 | 30 | 20 | 480 | 0.2 | 6 | 120 |
| 16 | 70 | 30 | 30 | 410 | 0.2 | 6 | 150 |
| 17 | 70 | 30 | 40 | 160 | 0 | 5 | 150 |

[1] Indicates the destruction of cohesion of the pressure-sensitive adhesive composition.
[2] Came off at the end of 8 min.
NOTE.—Conditions of measurement: at 20° C. and a relative humidity of 65%.

The tendency which is enumerated in the foregoing table did not change in case one of the components of the copolymer consisted of methyl acrylate or ethyl acrylate in place of n-butyl acrylate. In case a methacrylate was used as a component of the copolymer instead of an acrylate, the resulting adhesive composition exhibited the same tendency as that mentioned above from a content ratio of the methacrylate relative to the acrylic acid—which, when compared in the light of the same alkyl radicals, was less by about 5 percent equivalents than the percent equivalent which was required by an acrylate to show the same tendency. Also, in case homopolymers and copolymers of acrylamides or N-methylol acrylamides were used as the additive, their amount to be added and their copolymerization ratio were both found to be similar to those which were noted with respect to the cases in which acrylic acid was used as the additive.

EXAMPLE 3

In a manner similar to that described in Example 1, a solution of a pressure-sensitive adhesive composition having the following compositions:

| | Parts by wt. |
|---|---|
| Polyvinyl methylether | 100 |
| Copolymer of vinylmethylether-maleic anhydride (PVM-MA)[1] | 1 |
| 2,6-di-tert.-butyl-4-methylphenol | 1 |
| Methanol | 120 |

[1] Trade name: Gantrez AN-149, a product of General Aniline & Film Corporation of U.S.A. It has an $\eta_{sp}$ of 1.5-2.0. Other than this, there are also AN-119, AN-139, AN-169, etc., having different molecular weights. These PVM-MA can be equally effectively used by regulating their amounts in accordance wtih their own $\eta_{sp}$ values.

was prepared. By using this solution, adhesive tapes were manufactured. Also, in a similar manner, other adhesive tapes were manufactured by the use of a solution of a pressure-sensitive adhesive composite wherein the amount of PVM-MA was increased to 5 to 40 parts by weight. These adhesive tapes were subjected to a test similar to that described in Example 1. The result was that their cohesion, adhesion and tackiness all showed a tendency similar to that described in Example 1 in the case wherein the amount of the additive employed was up to 20 parts by weight. In case, however, the amount of the additive employed exceeded 20 parts by weight, there occurred a sharp reduction in both the adhesion and the tackiness, resulting in that the adhesive tapes were not suitable for practical use. Thus, the desirable amount of PVM-MA employed is in the range of from 1 to 20 parts by weight.

EXAMPLE 4

First, polyvinyl alcohol was dissolved in hot water of 80° C. or higher. Thereafter, an amount of methanol containing 2,6 - ditert - butyl-4-methylphenol dissolved therein was added to the first solution, and the resulting mixed solution was made homogeneous by stirring the same. Thereafter, a polyvinylmethyl ether was introduced into this homogeneous mixed solution and the same was stirred. As a result, a solution of a pressure-sensitive adhesive composition having the following composition:

| | Parts by wt. |
|---|---|
| Polyvinyl methylether | 100 |
| Polyvinyl alcohol (polymerization degree of 500, and saponification of 80% equivalent) | 2 |
| 2,6-di-tert-butyl-4-methylphenol | 1 |
| Methanol | 70 |
| Water | 50 | was prepared. By using this solution, adhesive tapes were manufactured. Furthermore, adhesive tapes were manufactured in a similar manner by the use of a pressure-sensitive adhesive composition wherein the amount of the polyvinyl alcohol added was in the range of 5-40 parts by weight. The adhesion, cohesion, tackiness and solubility in water of these adhesive compositions of the resulting tapes were measured, as well as the effective amount of polyvinyl alcohol added was investigated. As described in connection with Example 3, an amount ranging from 1 to 20 parts by weight of the additive was found to be suitable. It was also noted that the effective amount of the additive consisting of polyvinyl alcohol having a polymerization degree of 1000 and a saponification of 80% equivalent was found to be in the range of 1–15 parts by weight, whereas the effective amount of polyvinyl alcohol having a polymerization degree of 2000 and a saponification of 80% equivalent was found to be in the range of 1–10 parts by weight. In case polyvinyl alcohols having a sponification of 70% and 99% equivalent and a polymerization degree ranging from 500 to 200 were used, it was found that the same effect was obtained if the amount of the polyvinyl alcohol added was reduced by 5 parts by weight for each increase in the polymerization degree of the polyvinyl alcohol, as in the case where polyvinyl alcohol having a saponification of 80% equivalent was used. A reduction in the saponification was found to affect the solubility in water of the pressure-sensitive adhesive composites produced. For example, in case polyvinyl alcohol having a saponification of 70% equivalent was used, the resulting adhesive composition showed a solubility in water which was reduced to about ½ of the solubility in water of the adhesive composition where polyvinyl alcohol having a saponification of 99% equivalent was used as the additive.

EXAMPLE 5

A pressure-sensitive adhesive composition solution having the following composition:

| | Parts by wt. |
|---|---|
| Polyvinyl methylether | 100 |
| Water-soluble phenols resin [2] | 5 |
| 2, 6 - di-tert-butyl-4-methylphenol | 1 |
| Toluol | 200 |

[2] Trade name: Hitanol X-6021, a product of Hitachi Kasei Kogyo K.K. of Japan. This is a water-soluble resin which is prepared by modifying the initial condensate of phenol with oil and which is used mostly in paints. This resin has a non-volatile part amounting to 50±1% and a viscosity of 40-45 seconds measured with No. 4 Ford cup at 25° C.

was prepared. This solution was used to prepare adhesive tapes. As a result, adhesive tapes having an adhesion of 660 gr./25 mm. and a cohesion which was represented by a displacement of 0.4 mm. was obtained. After various experiments, the effective amount of the water-soluble phenolic resins added was found to be in the range of from 5 to 80 parts by weight. It was also noted that the pressure-sensitive adhesive composites obtained bore gradually increasing reddish color as the amount of the additive increased.

EXAMPLE 6

In a manner similar to that described in Example 1, there was prepared the solution of a pressure-sensitive adhesive composition having the following composition:

| | Parts by wt. |
|---|---|
| Polyvinylmethyl ether | 100.0 |
| Polyvinylethyl ether (EHBM, a product of U.C.C.) | 0.5 |
| Copolymer of 90 equivalent percent of acrylic acid and 10 equivalent percent of n-butyl acrylate | 5.0 |
| 2,6-di-tert-butyl-4-methyl phenols | 1.0 |
| Toluol | 250.0 |

By using this solution, an adhesive tape was manufactured. Also other adhesive tapes were manufactured by the use of a solution where the amount of the polyvinylethyl ether (EHBM) was increased to 1.0–50.0 parts by weight. This was used in a test similar to that described in Example 1. Both of these adhesive tapes showed a tendency similar to that described in Example 1 with respect to adhesion, cohesion and tackiness, but the limit of the solubility in water was 10.0 parts by weight. Furthermore, a similar test was conducted by the use of polyvinylethyl ether (EDBC) having a lower viscosity, with the result that an adhesive tape having a well balanced adhesion, cohesion and tackiness and having a water-solubility even where 50.0 parts by weight of EDBC was admixed was obtained.

EXAMPLE 7

An example of the experiment where a mixture of a polyvinylethyl and a polyvinylmethyl ether was used is shown as follows. Parts means parts by weight:

| Experiment No. | Parts | | | | | | | Adhesion strength (gr./25 mm.) | Tackiness No. | Cohesion strength (Displacement, mm.) | Water-solubility (sec.) |
|---|---|---|---|---|---|---|---|---|---|---|---|
| | Polyvinylmethyl ether | Polyvinylethyl ether | | | | (1) | Methanol | | | | |
| | | EDBC | EHBM | EHBN | PVM-MA | | | | | | |
| 1 | 100 | 25 | | | | 1 | [2] 400 | 1,160 | 12 | 1.0 | 95 |
| 2 | 100 | | 6 | | | 1 | [2] 400 | 1,090 | 10 | 0.9 | 80 |
| 3 | 100 | | | 2.5 | | 1 | [2] 400 | 1,040 | 10 | 0.9 | 90 |
| 4 | 100 | 10 | | | 2 | 1 | 400 | 1,150 | 8 | 0.2 | 60 |
| 5 | 100 | 50 | | | | 1 | 450 | 920 | 9 | 0.4 | 120 |
| 6 | 100 | | 2 | | 5 | 1 | 400 | 1,040 | 7 | 0.4 | 50 |
| 7 | 100 | | 8 | | 5 | 1 | 400 | 880 | 5 | 0.1 | 60 |
| 8 | 100 | | | 1 | 3 | 1 | 350 | 910 | 9 | 0.6 | 50 |
| 9 | 100 | | | 3 | 2 | 1 | 350 | 760 | 7 | 0.2 | 65 |
| 10 | 100 | 10 | 2 | | 5 | 1 | 400 | 770 | 5 | 0.5 | 80 |
| 11 | 100 | 20 | | | 2 | 1 | 450 | 900 | 8 | 0.5 | 100 |
| 12 | 100 | | 5 | 2 | 3 | 1 | 400 | 850 | 7 | 0.3 | 60 |
| 13 | 100 | 10 | 3 | 1 | 5 | 1 | 450 | 790 | 7 | 0.1 | 70 |

[1] 2,5-di-tert-butylhydroquinone.
[2] Toluol.

EXAMPLE 8

The following is an example of the experiment wherein a mixture of 2 or more kinds of water-soluble polymers was used. Part means part by weight:

| Experiment No. | Parts | | | | | | | | | |
|---|---|---|---|---|---|---|---|---|---|---|
| | Polyvinyl methyl ether | Polyvinylethyl ether | | | | Polyacrylic acid | (1) | (2) | Methanol | Water |
| | | EDBC | EHBM | EHBN | PVM-MA | | | | | |
| 14 | 100 | | | | 1 | 1 | | 1 | 250 | 100 |
| 15 | 100 | | | | | 2 | 1 | 1 | 250 | 100 |
| 16 | 100 | 10 | 2 | | 2 | 3 | | 1 | 300 | 100 |
| 17 | 100 | 20 | | 1 | | 3 | 2 | 1 | 300 | 100 |
| 18 | 100 | | 5 | | 2 | 2 | | 1 | 250 | 100 |
| 19 | 100 | | | 3 | 2 | 2 | | 1 | 250 | 100 |
| 20 | 100 | | 3 | 1 | | 3 | 1 | 1 | 250 | 100 |
| 21 | 100 | 10 | 2 | 2 | 2 | 1 | 1 | 1 | 300 | 100 |

[1] Copolymer of 90% equivalent of acrylic acid and 10% equivalent of n-butyl acrylate.
[2] 2,5-di-tert-butylhydroquinone.

| Experiment No. | Adhesion (gr./25 mm.) | Tackiness (No.) | Cohesion (Displacement, mm.) | Water-solubility (sec.) |
|---|---|---|---|---|
| 14 | 820 | 7 | 0.5 | 40 |
| 15 | 760 | 5 | 0.3 | 40 |
| 16 | 740 | 7 | 0.5 | 80 |
| 17 | 870 | 6 | 0.5 | 95 |
| 18 | 720 | 7 | 0.2 | 60 |
| 19 | 910 | 7 | 0.5 | 65 |
| 20 | 800 | 7 | 0.3 | 60 |
| 21 | 780 | 5 | 0.2 | 75 |

In case polyvinyl pyrrolidone selected from polyvinyl compounds, and carboxymethyl cellulose and hydroxyethyl cellulose which were cellulosic polymers were used as the additive, there were obtained adhesive tapes having the same properties as those of the adhesive tapes in Example 4 where polyvinyl alcohol was contained as the additive. The amount of these additives gave the similar findings as those noted in case polyvinyl alcohol was employed.

In order to compare with the adhesive tapes obtained in this example, there were manufactured control pressure-senstive adhesive tapes by the use of the pressure-sensitive adhesive composition having the following composition:

|   | Parts by wt. |
|---|---|
| Natural rubber (Crepe No. 1) | 100 |
| Polyterpene resin (Piccolite S-100) | 80 |
| 2,6-di-tert-butyl-4-methylphenol | 1 |
| Toluol | 950 |

This control pressure-sensitive adhesive composition was applied, to a thickness of 0.025 mm., onto a support consisting of a polyester film. The resulting adhesive tapes were compared, with respect to the adhesion, with the similar adhesive tapes prepared in accordance with the compositions described in Examples 1 through 5, respectively. The control adhesive tapes exhibited an adhesion of 820 gr./25 mm. which was a value substantially the same with the values exhibited by the adhesive tapes obtained according to the present invention.

The pressure-sensitive adhesive compositions of the present invention are never inferior to the conventional pressure-sensitive adhesive compositions in their properties such as adhesion, cohesion and tackiness. Besides, the pressure-sensitive adhesive compositions of the present invention are of the feature that they are soluble in water. Therefore, in case the pressure-sensitive adhesive compositions of the present invention are applied onto one surface of supports such as paper, cloth and plastic films of various kinds to prepare adhesive tapes and adhesive labels or the like, the resulting articles permit the use with a very simple procedure. In addition, when it is intended to peel off the adhesive tapes or adhesive labels from the faces of the objects to which the adhesive tapes or adhesive labels have been stuck, there may occur that part of the adhesive composition of such adhesive tapes or labels is retained on the faces of such objects. However, the adhesive compositions of the present invention can be removed completely off the surfaces of the objects with an extreme ease by merely washing the surfaces with water or by wiping them with wet cloths or like wet materials. Even when the surface of the object to which the adhesive composition is to be applied is slightly wet with water, the pressure-sensitive adhesive composition still will have the adhering ability, and accordingly, it can be applied to the wet face of the object. These are the advantages which can never be expected of the conventional adhesive articles. These features of the pressure-sensitive adhesive composites of the present invention can be utilized most effectively by applying them for the manufacture of adhesive labels, for example, which are applied onto the external surfaces of tableware, medical utensils, physical and chemical apparatuses, fruit, etc. Thus, the pressure-sensitivt adhesive composites of the present invention will have a wide range of utility in various other fields also in addition to those enumerated above.

What is claimed is:

1. A water-soluble pressure-sensitive adhesive composition consisting essentially of a mixture of (a) polyvinylmethyl ether and (b) an acrylic polymer selected from the group consisting of polyacrylic acid, polyacrylamide, N-methylol polyacrylamide and acrylic copolymer of a monomer selected from the group consisting of acrylic acid, acrylamide and N-methylol acrylamide and a monomer selected from the group consisting of lower alkyl esters of acrylic acid and methacrylic acid, said acrylic polymer being mixed with said polyvinylmethyl ether in an amount in the range of 0.5 to 30 parts by weight per 100 parts by weight of the polyvinylmethyl ether.

2. A water-soluble pressure-sensitive adhesive composition according to claim 1, wherein said acrylic copolymer is a copolymer of acrylic acid and n-butyl acrylate.

3. A water-soluble pressure-sensitive adhesive composition consisting essentially of a mixture of (a) polyvinylmethyl ether, (b) polyvinylethyl ether and (c) an acrylic polymer selected from the group consisting of polyacrylic acid, polyacrylamide, N-methylol polyacrylamide and acrylic copolymer of a monomer selected from the group consisting of acrylic acid, acrylamide and N-methylol acrylamide and a monomer selected from the group consisting of lower alkyl esters of acrylic acid and methacrylic acid, the amount of said polyvinylethyl ether being less than about 50 parts by weight per 100 parts by weight of the polyvinylmethyl ether, and the amount of said acrylic polymer being from 0.5 to 30 parts by weight per 100 parts by weight of the polyvinylmethyl ether.

References Cited
UNITED STATES PATENTS

| | | | |
|---|---|---|---|
| 2,531,364 | 11/1950 | Runyan | 260—874 |
| 2,557,266 | 6/1951 | Dittmar et al. | 260—901 |
| 2,647,100 | 7/1953 | Salditt | 260—874 |
| 2,866,772 | 12/1958 | Sellars | 260—874 |
| 2,937,956 | 5/1960 | Fendius et al. | 260—874 X |
| 2,965,592 | 12/1960 | Ethier et al. | 117—122 PA |
| 3,098,838 | 7/1963 | Goldberg et al. | 260—875 |
| 3,287,205 | 11/1966 | Bugel | 260—874 |
| 3,313,647 | 4/1967 | Weymann | 117—122 PA |
| 3,462,342 | 8/1969 | Cooper et al. | 260—874 X |
| 3,257,478 | 6/1966 | Jubilee et al. | 260—901 |

WILLIAM H. SHORT, Primary Examiner

L. M. PHYNES, Assistant Examiner

U.S. Cl. X.R.

117—122 P, 122 PA; 156—327; 161—167; 260—17 R, 874